United States Patent [19]

Matty

[11] 4,410,154

[45] Oct. 18, 1983

[54] TRANSIT VEHICLE BRAKE CONTROL APPARATUS AND METHOD

[75] Inventor: Thomas C. Matty, North Huntingdon, Pa.

[73] Assignee: Westinghouse Electric Corp., Pittsburgh, Pa.

[21] Appl. No.: 257,681

[22] Filed: Apr. 27, 1981

Related U.S. Application Data

[63] Continuation of Ser. No. 51,913, Jun. 25, 1979, abandoned.

[51] Int. Cl.³ .............................................. B61L 11/02
[52] U.S. Cl. ............................ 246/182 B; 246/182 C; 364/426
[58] Field of Search ........... 246/187 B, 187 C, 182 B, 246/182 R, 63 C, 63 R, 34 R, 5, 182 C; 364/424, 426

[56] References Cited

U.S. PATENT DOCUMENTS

| | | | |
|---|---|---|---|
| Re. 27,472 | 9/1972 | Thorne-Booth | 246/34 CT |
| 3,041,449 | 6/1962 | Bingen | 246/182 |
| 3,363,096 | 1/1968 | Hughson et al. | 246/182 B |
| 3,532,877 | 10/1970 | Thorne-Booth | 246/63 |
| 3,593,022 | 7/1971 | Hoyler et al. | 246/34 R |
| 3,724,916 | 4/1973 | Hirzel | 303/20 |
| 3,729,234 | 4/1973 | Hirzel | 188/181 C |
| 3,749,994 | 7/1973 | Matty | 318/563 |
| 3,768,873 | 10/1973 | Hirzel | 303/20 |
| 3,871,715 | 3/1975 | Hikida et al. | 188/181 C |
| 3,904,251 | 9/1975 | Hikida et al. | 188/181 C |
| 3,934,125 | 1/1976 | Macano | 246/182 B |
| 3,966,148 | 6/1976 | Sahasrabudhe | 246/187 B |
| 3,998,496 | 12/1976 | Bernabo et al. | 303/106 |
| 4,006,942 | 2/1977 | Saito et al. | 303/109 |
| 4,043,608 | 8/1977 | Bourg et al. | 303/104 |
| 4,047,766 | 9/1977 | Bleckmann | 303/97 |
| 4,270,716 | 6/1981 | Anderson | 246/187 B |

OTHER PUBLICATIONS

*IEEE Annual Meeting*, "San Paulo Metro E-W Line Innovations", Costa, 1977, pp. 1105–1109.
*Westinghouse Engineer*, Hoyler, Sep. 1972, pp. 145–151.

*Primary Examiner*—James J. Groody
*Attorney, Agent, or Firm*—R. G. Brodahl

[57] ABSTRACT

There is disclosed a transit vehicle brake control apparatus and method which determines a safe brake velocity for the vehicle in relation to a speed control relationship including roadway system design deceleration, the deceleration of the vehicle in relation to inertial space and the deceleration of the vehicle in relation to the roadway, when the actual speed is greater than the input command speed for the vehicle from the roadway. The actual speed of the vehicle is compared with the determined safe brake velocity for the control of the vehicle speed.

16 Claims, 7 Drawing Figures

TRANSIT VEHICLE BRAKE CONTROL APPARATUS AND METHOD

This is a continuation of application Ser. No. 051,913, filed June 25, 1979 now abandoned.

BACKGROUND OF THE INVENTION

It is known in the prior art for a train vehicle to be operating along a roadway track divided into signalling blocks of predetermined lengths, with a low impedance connection being provided between the track rails at the end of each such signalling block. A signal transmitter is operative with one end of each signal block at one of several frequencies and a cooperative signal receiver is coupled with the other end of each signal block for controlling the operation of a train vehicle positioned within that signal block such as described in U.S. Pat. No. Reissue 27,472 and U.S. Pat. No. 3,532,877 of G. M. Thorne-Booth and in U.S. Pat. No. 3,593,022 of G. M. Thorne-Booth et al. A published article entitled "Automatic Train Control Concepts Are Implemented by Modern Equipment" was published in the September, 1972 Westinghouse Engineer at pages 145 to 151 and disclosed this operation of a train vehicle.

The train vehicle carried a signal receiver which sensed a desired input command speed coded signal within the signal block occupied by that vehicle and which input command speed signal was decoded to provide a desired speed command signal to the propulsion control apparatus of the vehicle to result in energizing the propulsion motors for regulating the actual speed in accordance with the desired speed of operation along the track and within each signal block. If the actual speed of the vehicle is too low, more propulsion effort is required and if the actual speed is too high, then braking of the vehicle is required. A propulsion enable signal is provided to the vehicle propulsion and brake system when the actual speed of the vehicle is less than the desired speed for that vehicle within a given signal block. When the actual speed of the vehicle is greater than the desired speed, then the propulsion enable signal is not provided and the full service brake will be applied. For the train vehicle to move along the roadway track, it must be out of full service brake condition of operation to move in response to a desired speed signal.

It was known in the prior art to provide brake assurance to validate that the vehicle is properly responding to the decelerating request, as set forth in an article published in the Conference Record of the 12th annual meeting of the IEEE Industry Applications Society, Los Angeles, Calif., October 1977. Problems which can cause improper response include brake system failure or loss of traction. If brake system failure is the primary concern then the vehicle response can be measured to a limited degree by wheel deceleration. If traction loss is to be detected, then a slip-slide system can measure the loss.

It is known in the prior art to provide a speed control system employing redundancy techniques to achieve a high degree of failsafety and speed control accuracy. For this purpose, two tachometers producing signals proportional of vehicle speed and two substantially identical signal processing channels are provided for redundancy, with one signal channel responding to a desired speed ONES input signal and the other signal channel responding to a desired speed ZEROS input signal. Each such signal processing channel produces an output speed error signal equal in magnitude but opposite in polarity from the output speed error signal of the other channel when the system is operating properly. The speed output error signal from each channel is applied to respective level detectors which provide control signals to an alarm and braking apparatus for braking the vehicle or train the vehicles whenever an overspeed condition is sensed. The signal outputs of the two channels are compared and when they are not of the same magnitude indicating a failure in one or possibly both of those channels, an alarm is actuated again and the vehicle is braked. The speed error signal outputs of the two signal processing channels are summed and the mean value of the resultant summation is used as a speed error signal for controlling the drive motors of the vehicle during the time an overspeed condition is not sensed, as described in U.S. Pat. No. 3,749,994 of T. C. Matty.

It was known in the prior art to use an accelerometer carried by a transit vehicle in the form of a pendulum which was operative to release the brake effort of the vehicle if too much braking of the vehicle resulted in too rapid stopping of the vehicle for the comfort of the passengers. In this regard, a switch was connected with the pendulum and was opened to release the brakes when the pendulum swung too far from the center position.

A general description of microprocessors and the related peripheral devices suitable for the practice of the present invention is provided in the Intel 8080 Microcomputer Systems Users Manual currently available from Intel Corp., Santa Clara, Calif. 95051.

SUMMARY OF THE INVENTION

An improved transit vehicle brake control provides an accurate and safe brake assurance through the determination of a maximum safe brake velocity or deceleration profile, based on vehicle travel time and in response to a change in the input command or desired speed received from the roadway track. A speed regulation of the vehicle movement is provided in relation to the previous input command speed until a predetermined difference is detected between the generated maximum safe velocity and the vehicle actual speed, when the vehicle speed regulation then responds to the generated maximum safe velocity or speed. When the new input command speed is equal to or greater than the generated maximum safe velocity, the new command spaced becomes the speed reference for the vehicle speed regulation.

DESCRIPTION OF THE PREFERRED EMBODIMENT

Figure 1:
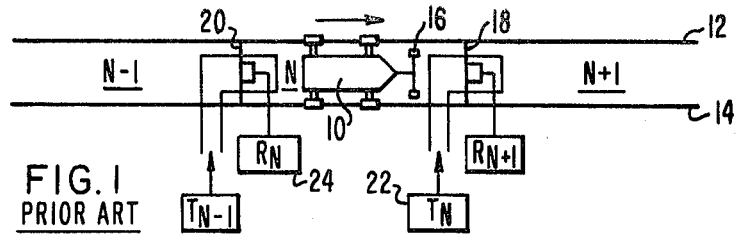
FIG. 1 is a schematic showing of a prior art transit vehicle operative with a roadway track including a plurality of signal blocks.

In FIG. 1, there is shown a prior art roadway track arrangement including a transit vehicle 10 operative with tracks 12 and 14 in a direction indicated by the arrow. The train vehicle 10 includes a speed signal receiving antenna 16 operative with the coded desired or command speed signal provided to signal block N as defined by the low impedance member 18 and the low impedance member 20 connected between the rails 12 and 14 of the roadway track. The track is shown divided into signal blocks N-1, N, N+1 and so forth, with each signal block being energized by a command speed signal. The signal block N receives a command speed signal from transmitter 22 which is cooperative with a receiver 24 for determination by wayside equipment of the occupancy of the signal block N by the train vehicle 10, for the purpose of controlling additional train vehicles moving along the road-way track and following behind the train vehicle 10. The command speed signal supplied to the signal block N by the transmitter 22 represents the maximum desired speed for the safe passage of the train vehicle 10 through the particular signal block N.

Figure 2:
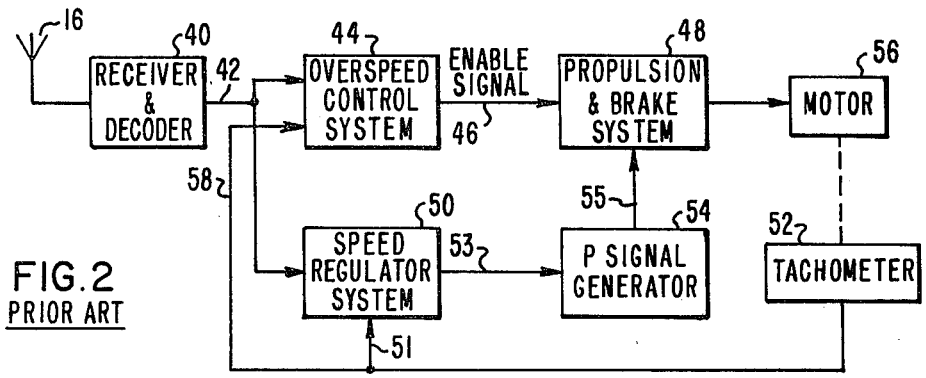
FIG. 2 is a schematic showing of a prior art transit vehicle speed and brake control system.

In FIG. 2, there is shown a prior art vehicle brake control system including an antenna 16 for receiving the command speed signal from the roadway track, which signal is supplied to a receiver and decoder 40 for providing a command speed signal 42 which then goes to an overspeed control system 44 for determining the provision of a propulsion enable signal 46 to the propulsion control system 48 of the transit vehicle. The desired or command speed signal 42 also goes to a speed regulator system 50 for comparison with an actual vehicle speed signal 51 from a tachometer 52 for determining a vehicle speed error signal 53 to the P signal generator 54 to establish the tractive effort request P signal 55 which is supplied to the propulsion control system 48 for determining the operation of the vehicle motor 56 and thereby the operating speed of the transit vehicle along the roadway track. The output signal 46 from the overspeed control system 44 enables the propulsion control system 48 to respond to the P signal 55 and to energize the vehicle motor 56 for a safe speed control of the transit vehicle. When the actual speed of the vehicle as indicated by the actual speed signal 58 is compared by the overspeed control system 44 with the command speed signal 42, if the actual speed is less than the command speed the propulsion enable signal 46 is provided. On the other hand, when the actual speed 58 is greater than the command speed 42, the propulsion enable signal 46 is not provided and the propulsion control system 48 provides for the vehicle brakes to operate.

Figure 3:
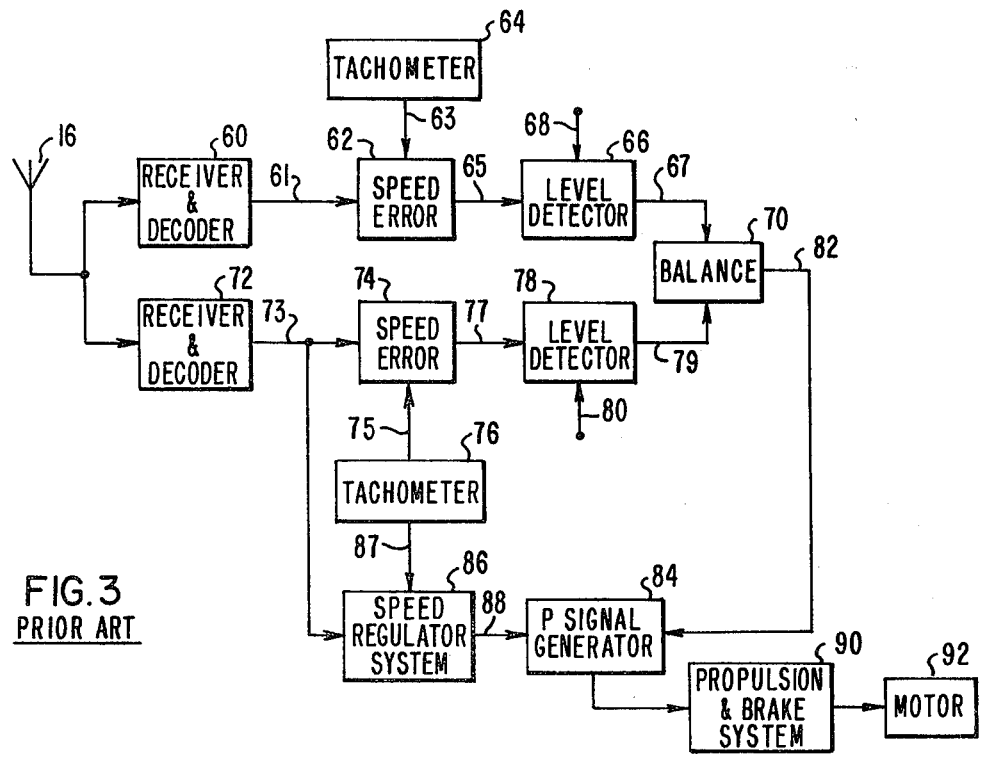
FIG. 3 is a schematic showing of a prior art vehicle speed and brake control system.

In FIG. 3, there is a schematic showing of a prior art transit vehicle speed and brake control system in accordance with the disclosure of above-referenced U.S. Pat. No. 3,749,994, and including a first receiver and decoder 60 operative with the antenna 16 for providing a ONES command speed signal 61 as an input to the speed error apparatus 62 for comparison with an actual speed signal 63 input to the speed error apparatus 62 received from the tachometer 64 operative with the wheels of the vehicle. A resulting speed error signal 65 is applied as an input to a level detector 66, and if the magnitude of the speed error signal is above a predetermined level determined by setpoint input 68, an output signal 67 is provided to the balance circuit 70. A second receiver and decoder 72 is operative with the antenna 16 for providing a ZEROS command speed signal 73 to the speed error apparatus 74 in accordance with the ZEROS information of the command speed information in the roadway track as sensed by the antenna 16. The speed error apparatus 74 receives an actual speed signal 75 from a tachometer 76 for comparison with the command speed signal 73 from the receiver and decoder 72 to provide a speed error or difference signal 77 to a level detector 78. If the speed error signal 77 has an amplitude greater than the setpoint provided by the reference input 80, the balance circuit 70 receives an output 79 from the level detector 78. If the output 67 from the level detector 66 is substantially the same as the output 79 from the level detector 78, the balance circuit 70 provides an enable signal 82 to enable the operation of the P signal generator 84. The command speed signal 73 from the receiver and decoder 72 goes to a speed regulator 86 which receives an actual vehicle speed signal 87 from the tachometer 76 to provide a speed error signal 88 to the P signal generator 84 for determining the tractive effort request P signal and the operation of the propulsion and brake control 90 and in turn the operation of the vehicle motor 92 for providing the desired tractive effort of the motor 92 to move or brake the vehicle in relation to the roadway track.

Figure 4:
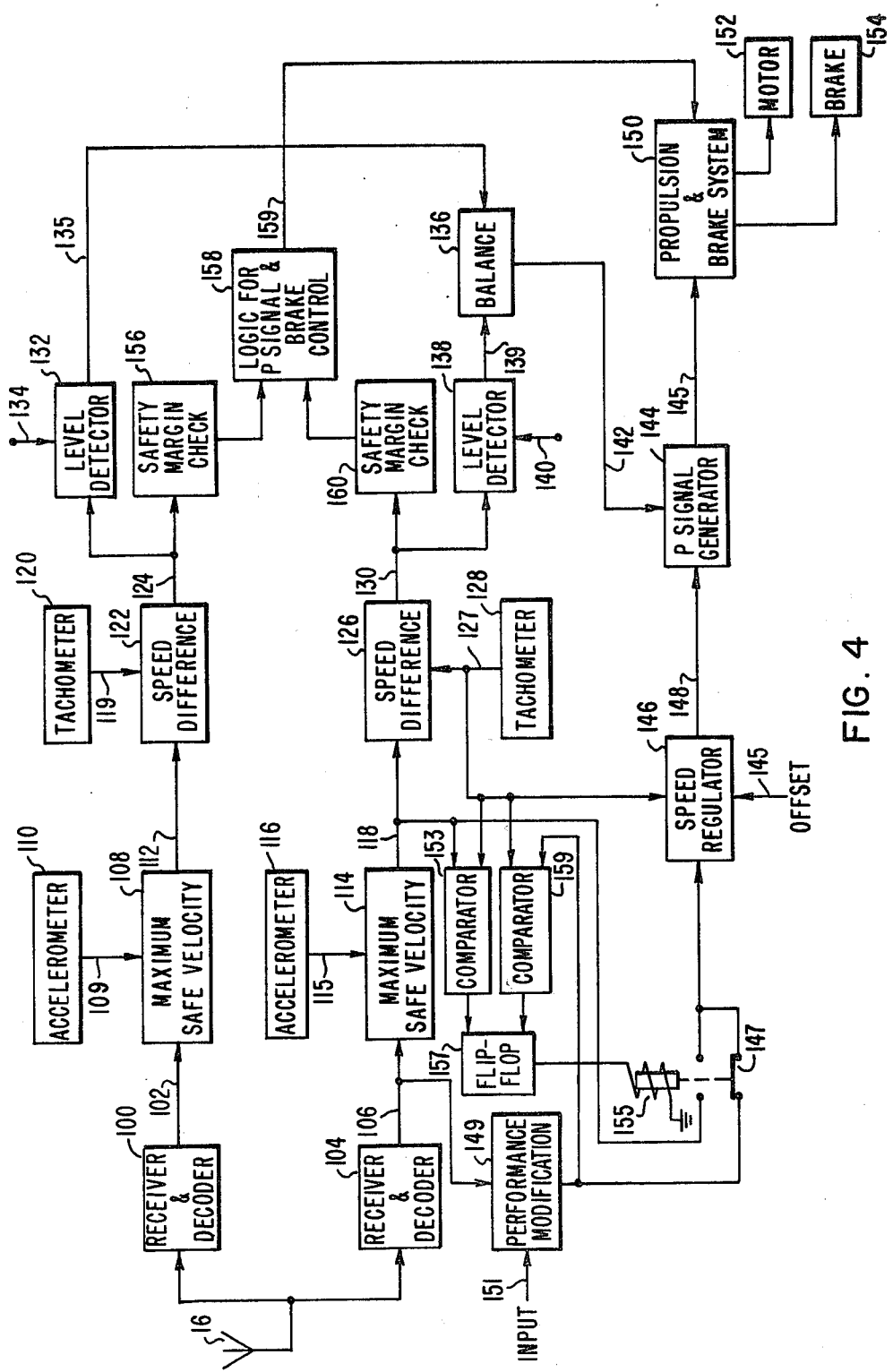
FIG. 4 is a general showing of the speed and brake control of the present invention.

In FIG. 4, there is shown the speed and brake control system of the present invention. The antenna 16 functions with the roadway track for receiving the coded input speed command information. The receiver 100 receives the ONES coded speed information and provides a command speed signal 102. The receiver and decoder 104 receives the ZEROS coded speed information and outputs a command speed signal 106. The maximum safe velocity determination apparatus 108 responds to the ONES command speed signal 102 and responds to the vehicle acceleration signal 109 from a vehicle accelerometer 110 to provide a maximum safe brake velocity or speed signal 112. A maximum safe velocity determination apparatus 114 responds to the ZEROS command desired speed signal 106 and to the vehicle acceleration signal 115 from a vehicle accelerometer 116 to provide a maximum safe brake velocity or speed signal 118. The speed error or difference device 122 determines the difference between the vehicle actual speed signal 119 from the tachometer 120 and the maximum safe velocity signal 112 to provide a speed difference signal 124. The speed error or difference device 126 determines the difference between the maximum safe velocity signal 118 and the vehicle actual speed signal 127 from tachometer 128 for providing a speed difference signal 130. The speed difference signal 124 from the speed difference device 122 is supplied to a level detector 132 for determining if the speed difference signal 124 is above a minimum reference setpoint signal provided on input 134, and if it is above that minimum reference signal, an output signal 135 is supplied to a balance detector 136. The level detector 138 responds to the speed difference signal 130 and compares it with a minimum reference setpoint signal on input 140, and if the speed difference is greater than the minimum reference from input 140 an output 139 is provided to the balance detector 136. If the output 135 from level detector 132 and the output 139 from level detector 138 are substantially the same and in balance, an enable signal 142 is provided to the P signal generator 144.

A speed regulator 146 is responsive to the input command speed 106 and compares it with the actual vehicle speed 127 from tachometer 128 for providing a speed error signal 148 to the P signal generator 144 for establishing the tractive effort request P signal 145 to the propulsion and brake system 150 that is operative in conjunction with the vehicle motor 152 or the vehicle brake 154 to determine the vehicle operation as well known to persons skilled in this art.

A performance modification 149 can be provided if desired to set the vehicle speed as some predetermined percentage of the command speed 106 from the receiver and decoder 104. The performance modification 149 modifies the command speed signal 106 and causes the vehicle through operation of the speed regulator 146 to run at some percentage less or for an absolute number less than is desired for the actual vehicle operation, for example, due to lower track adhesion or some known vehicle scheduling relationship with the other transit vehicles on the system and the like.

The speed difference signal 124 from the speed difference device 122 is supplied to a safety margin check 156 which is operative with the logic for signal and brake control 158 to provide output signal 159 to determine the operation of the propulsion and brake system 150 as will be later explained. The speed difference signal 130 from the speed difference device 126 is provided to the safety margin check 160 and determines the operation of the logic for signal and brake control 158 in relation to providing the output signal 159 to the propulsion and brake system 150.

The operation of the maximum safe velocity determination apparatus 108 and the speed difference device 122 in relation to the ONES coded input speed command can be provided by a first microprocessor, such as the Intel 8080, including a particular vehicle system application control program determined by the program set forth in Appendix A. The operation of the maximum safe velocity determination apparatus 114 and the speed difference device 126 in relation to the ZEROS coded input speed command can be provided by a second microprocessor, such as the Intel 8080, including a particular vehicle system application control program determined by the program set forth in Appendix A. Thusly, the maximum safe velocity $V_{max}$ for the present time (t) is determined when the actual speed is greater than the input command speed and in relation to the maximum safe velocity $V_{max}$ for the previous time (t−1) minus the ratio of the actual speed $V_t$ to the previous maximum safe velocity $V_{max}$ times (R−I+A) times the interval $\Delta t$ between the present determination at time t and the previous determination at time (t−1).

Figure 6:
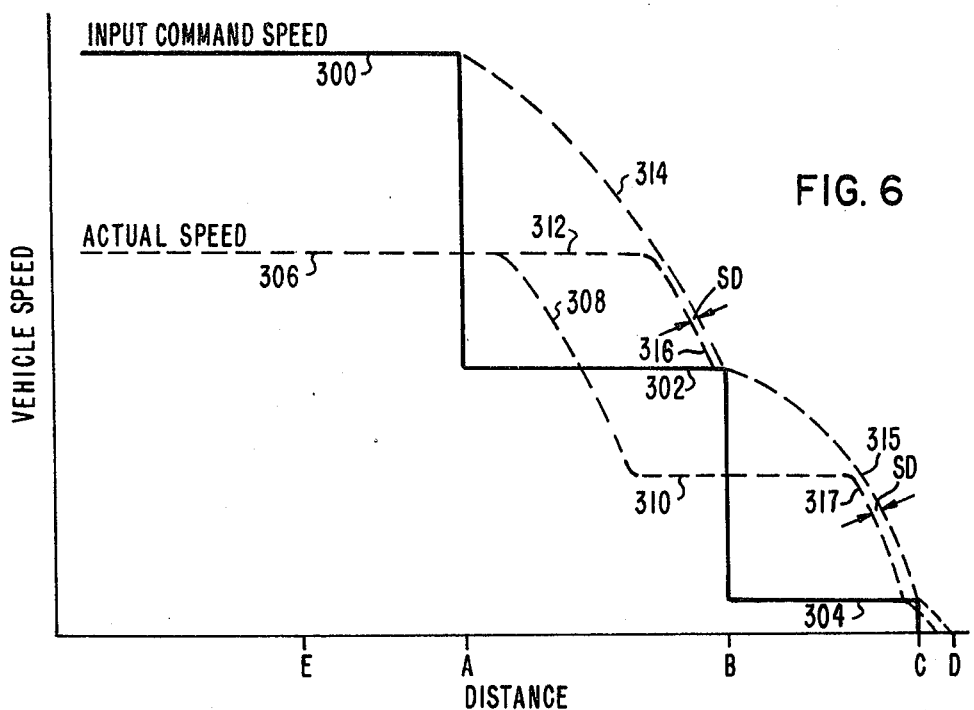
FIG. 6 is a curve plot illustrating the operation of the present speed and brake control.

The speed regulator 146 shown at the bottom of FIG. 4 allows the vehicle to run at the actual speed 306 such as shown in FIG. 6 and to approach within a predetermined speed difference SD of the maximum velocity profile 314.

For as long as the command speed is greater than the vehicle actual speed, the switch 147 shown in FIG. 4 is operative to permit the vehicle to run at the command speed, as shown in FIG. 4 and as determined by the performance modification 149 in response to a reference input 151 which may be a manual input from the operator of the transit vehicle or may be from the automatic train operation control system in response to the command speed 300 from the track circuits in the particular signal block in which the transit vehicle is located. When the command speed changes such that the actual speed is greater than the command speed, the maximum safe brake velocity 118 is determined. When the actual vehicle speed approaches within a predetermined difference less than the maximum safe velocity in accordance with the profile 314 and as sensed by the comparator 153 operative with the flip-flop memory 157, which compares the vehicle actual speed 127 from the tachometer 128 with the maximum safe velocity 118, then the coil 155 is energized to raise the switch member 147 such that the determined maximum safe velocity 118 is applied as the reference input to the speed regulator 146 for causing the vehicle to decelerate in accordance with the maximum safe velocity profile 314. A speed offset 145 in accordance with the speed difference SD is provided to the speed regulator 146 for controlling the actual speed to maintain the desired speed difference SD. Assume that the command speed 300 shown in FIG. 6, which corresponds to the output 106 of the receiver and decoder 104, is changed by the performance modification 149 and is applied through the switch 147 as the command speed shown by curve 306 to the speed regulator 146, the vehicle will continue to travel at the actual speed 306 until distance A is reached. At distance A, a downward input command speed change to curve 302 is provided to reduce the vehicle speed in relation to the known track system braking requirements. The maximum safe velocity determination apparatus 114 begins to determine the maximum safe velocity signal 118. The comparator 153 senses the actual speed 127 and the maximum safe velocity 118 to permit the vehicle to continue to run at speed 306 and as shown by curve extension 312 until the vehicle actual speed approaches the maximum sae velocity profile 314 by a predetermined difference speed SD, at which time the switch 147 is operated by the memory 157 and the determined maximum safe velocity 118 becomes the control reference for the speed regulator 146 and the vehicle. When the actual speed is again below the command speed, the maximum safe velocity 118 is no longer determined and the switch 147 drops such that the command speed 106 becomes the reference to the speed regulator 146.

The comparator 153 senses when the actual speed is within a predetermined difference SD below the maximum safe brake velocity, and at that time provides an output to the flip-flop memory 157 to energize the winding 155 and pick up the relay contact 147 to connect the maximum safe velocity signal 118 to be the reference input for the speed regulator 148. The comparator 159 senses when the actual speed is below the command speed and provides a reset output to the flip-flop memory 157 to deenergize the winding 155 and drop the contact 147 to the position shown in FIG. 4. The comparator 153 does not provide an output until after the actual speed is again above the command speed as sensed by the maximum safe velocity determination apparatus 114 and the maximum safe brake velocity is again being determined, and in addition the actual speed is within a predetermined distance SD below the maximum safe brake velocity.

Figure 5:
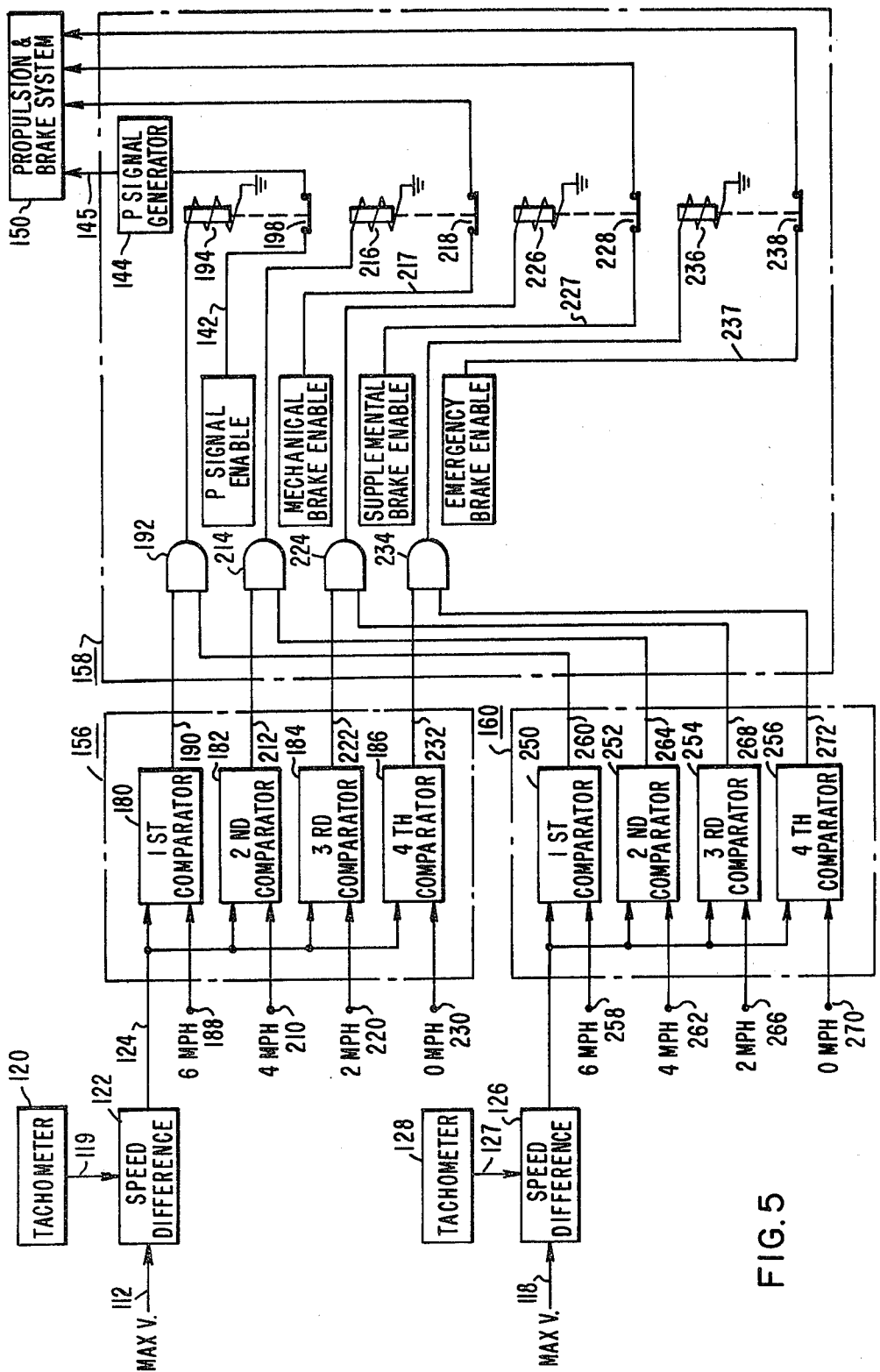
FIG. 5 is a schematic showing of a portion of the speed and brake control of the present invention.

In FIG. 5, there is provided a schematic showing of the safety margin check 156 and the safety margin check 160 in relation to the logic for signal and brake control 158 as generally illustrated in FIG. 4. The maximum safe velocity signal 112 is provided to the speed difference device 122. The actual vehicle speed 119 is provided from the tachometer 120 to the speed difference device 122 such that the output speed difference signal 124 is then provided to one input of each of a first comparator 180, a second comparator 182, a third comparator 184, and a fourth comparator 186 within the safety margin check apparatus 156. The first comparator 180 has a first level setpoint 188, such as 6 mph for example, and is operative to provide a signal 190 when the speed difference signal 124 is greater than the setpoint reference 188, which output 190 goes to one input of an AND logic device 192 for energizing the winding 194 of a relay including a contact 198 which is normally open and falls by gravity when there is no output signal from the AND device 192. When there is an output signal from the AND device 192, the coil 194 holds up the contact 198 such that a P signal enable 142 is provided and the traction effort request P signal 145 is supplied to provide a first brake effort by the propulsion and brake control system 150. When the speed difference signal 124 that is provided to the second comparator 182 is greater than the setpoint reference speed 210 such as 4 mph for example, an output 212 is provided to one input of AND device 214 for energizing the winding 216 operative with a contact member 218 for providing a second brake effort by the mechanical brake enable signal 217 to the propulsion and brake control 150. When the speed difference signal 124 applied to the third comparator 184 is greater than the setpoint reference 220, such as 2 mph for example, an output signal 222 is provided which energizes one input of AND device 224 for energizing the winding 226 operative with a contact member 228 for providing a third brake effort by the supplemental brake enable signal 227 to the propulsion and brake control system 150. When the speed difference signal 124 that is applied to one input of the fourth comparator 186 is greater than the setpoint reference signal 230, such as 0 mph for example, an output signal 232 is provided for energizing one input of AND device 234 causing the winding 236 to raise the contact member 238 to provide a fourth brake effort by the emergency brake enable signal 237 to the propulsion and brake control system 150.

The maximum safe velocity signal 118 that is supplied to the speed difference device 126 is compared with the actual vehicle speed 127 from the tachometer 128 to provide a speed difference signal 130 which is supplied to one input of each of a first comparator 250, a second comparator 252, a third comparator 254, and a fourth comparator 256. When the speed difference signal 130 is greater than a first level reference signal 258, such as 6 mph, the first comparator 250 provides an output signal 260 for energizing the second input of AND device 192 to cause the winding 194 to lift the contact member 198 and supply the P signal enable 142 to the P signal generator 144 and the propulsion and brake control system 150. When the speed difference signal 130 applied to the second comparator 252 is greater than a second reference signal 262, such as 4 mph, an output signal 264 for energizing a second input of AND device 214 for causing the winding 216 to hold the contact member 218 to provide the mechanical brake enable signal 217 to the propulsion and brake control system 150. When the speed difference signal 130 applied to the third comparator 254 is greater than the third level reference signal 266, such as 2 mph, an output 268 is provided to the AND device 224 for causing the contact member 228 to provide the supplemental brake enable signal 227 to the propulsion and brake system 150. When the speed difference signal 130 applied to the fourth comparator 256 is greater than the fourth level reference signal 270, such as 0 mph, an output 272 is provided to AND device 234 for causing contact member 238 to be raised and to provide the emergency brake enable signal 237 to the propulsion and brake control system 150.

In FIG. 6, there is shown a curve plot illustrating the operation of the present speed and brake control system. The command speed changes are shown to include the input command speed change from a value 300 at distance A to a command speed 302, which then changes at distance B to a command speed 304, and which changes at distance C to a command speed of 0. If the actual speed of the vehicle is shown by the dotted line 306, at vehicle distance location A the prior art speed control system as shown in FIG. 3 would respond to the new command speed 302 to follow the path 308 down to the speed 302 and perhaps lower than the speed 302 to some predetermined level 310 when determined by requested performance modifications and the like. Instead, it is desired in accordance with the present invention that the actual speed of the vehicle follow the path 312 in relation to the determined maximum safe velocity of the vehicle as shown by the curve 314. When a predetermined speed difference SD, which for the example of FIG. 5 can be 6 MPH, occurs between the maximum safe velocity profile 314 and the actual speed of the vehicle 312, then the actual speed is controlled to follow the path 316 maintaining this predetermined speed difference SD until the new command speed 302 is reached. Upon the next downward input command speed change at vehicle distance location B to the new command speed 304, if the vehicle actual speed is at 310, the vehicle would continue at this same actual speed of 310 until a predetermined speed difference SD is provided in relation to the determined maximum safe velocity 315 at which time the vehicle would then follow the curve 317 while maintaining this speed difference until the next downward speed change at distance location C. The actual speed of the vehicle at distance location C would then come down to a zero speed at approximately the location of the desired stopping point D.

Figure 7:
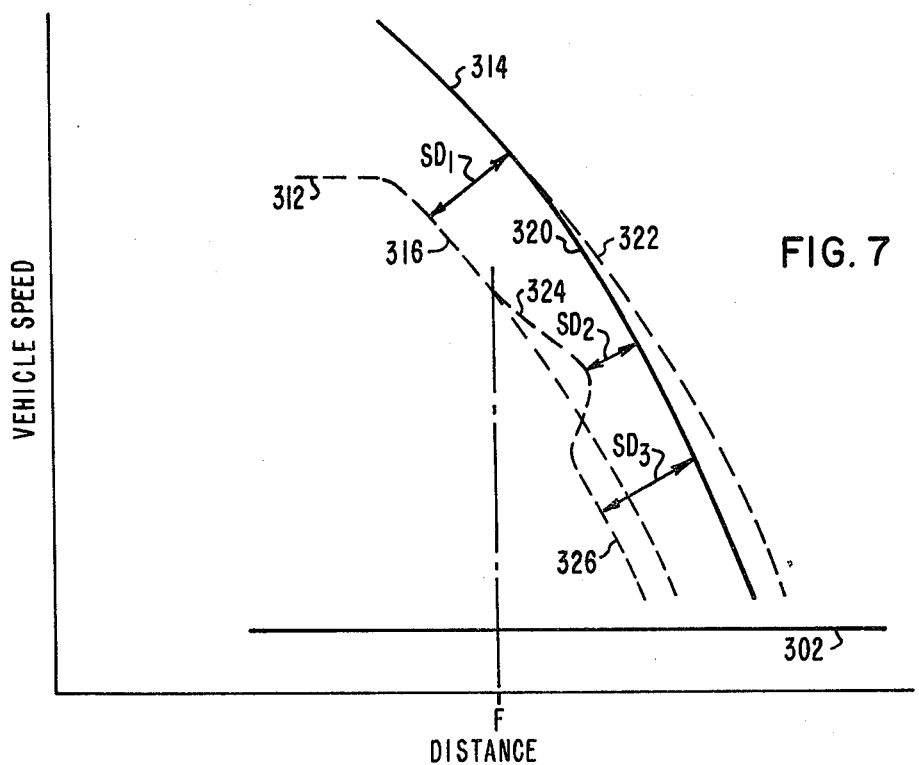
FIG. 7 is a curve plot illustrating the modification of the determined VMAX relationship in response to a failure of the transit vehicle to respond adequately to a previously determined VMAX parameter.

In FIG. 7, the actual speed of the vehicle is shown by curve 312 in relation to the determined maximum safe velocity 314. It is desired that a predetermined speed difference $SD_1$ be maintained between the maximum safe velocity 314 and the vehicle actual speed 316. If for some reason the brake operation of the vehicle should not be satisfactory due to the normal track condition adhesion being reduced or the like, and the vehicle actual speed would leave the desired curve 316 to an actual velocity curve 324 where a reduced speed difference $SD_2$ is provided, then the maximum safe velocity determination apparatus 108 and 114 as shown in FIG. 4 would each modify the determined maximum safe velocity in relation to the new conditions of vehicle operation, and establish the modified maximum safe velocity curve 320 instead of the otherwise previous maximum safe velocity curve 322. This modified maximum safe velocity curve 320 would then increase the brake operation of the vehicle in an effort to retard the velocity of the vehicle and maintain this speed difference $SD_1$. The vehicle would then follow a velocity path 326 which provided a speed difference $SD_3$, similar to the desired speed difference $SD_1$, as the vehicle actual speed decreased down to the next input command speed level 302. The desired speed difference SD between the vehicle actual velocity and the determined maximum safe velocity is continuously determined, and as the actual speed approaches the maximum safe velocity profile, different kinds of successively increasing braking action can be taken. As this speed difference gets smaller and smaller, the succeeding operations take place such as, for example, initially the application of a brake operative with the vehicle wheels is provided, and if the actual speed of the vehicle does not thereafter maintain a desired predetermined speed difference in relation to the maximum velocity profile, then an additional supplemental braking effort such as putting sand on the roadway track can be provided, and if this does not adequately reduce the actual velocity of the vehicle as desired, then an additional braking effort such as emergency spring applied track brakes that press wooden shoes against the vehicle tracks can be provided. This is illustrted in relation to FIG. 5 where the AND gate 192 provides an output signal 142 to the P signal generator 144 to enable the provision of the P signal to the propulsion and brake system such that the output of the AND gate 192 provides the P signal enable 142; and when the speed difference output as determined by either of the speed difference device 122 or the speed difference device 126 indicates that the determined speed difference is less than 6 mph, the AND gate 192 does not provide an output and the contact 198 drops by gravity to no longer enable the P signal generator 144 to provide the tractive effort determining P signal to the propulsion and brake system 150. In a similar manner, when the speed difference output of either of the speed difference devices 122 or 126 is less than 4 mph, the AND gate 214 no longer provides an output signal such that the mechanical brake enable signal 217 no longer is provided and contact 218 drops to no longer hold off the mechanical brakes and this results in the mechanical brakes being energized in an effort to stop the transit vehicle. When this speed difference output is less than 2 mph, the AND gate 224 no longer provides an output such that the supplemental brake enable 227 is then not provided to the propulsion and brake system 150 to result in an additional brake effort such as providing sand on the vehicle tracks or the like. And when this speed difference output is less than 0 mph, the AND gate 234 does not provide an output signal and the emergency brake enable 237 is then not provided to the propulsion and brake system 150 such that the additional braking effort provided by emergency spring track brakes or the like is provided to reduce the velocity of the transit vehicle. The logic for signal and brake control 158 as shown in FIG. 4 and FIG. 5 permits the vehicle to continue at less than the determined maximum safe velocity 314 shown in FIG. 6 as long as the actual speed is less than this maximum safe velocity, and this allows additional distance for the vehicle to travel as shown by curve 312 in FIG. 6.

As shown in FIG. 6, the track system determined allowed safe input command speed is shown by the curve steps 300, 302 and 304, and in practice is determined by the train vehicle system designers going backwards from a known desired stopping point D in relation to the known safe braking characteristics of the transit vehicles and the normal roadway track conditions including vehicle brake operation and the like. The downward command speed changes between the command speed 300 and the command speed 302 and the command speed 302 and command speed 304 which occur respectively at indicated distances A, B and C are provided in relation to this system determined allowed safe speed. It was the prior art practice for the vehicle speed to respond to the input command speed change at distance A in accordance with the speed curve 308 until reaching the command speed 302 or if it is desired that the actual speed be a predetermined speed difference below the command speed, then the actual vehicle speed would proceed to the level such as shown at 310. This resulted in the vehicle travelling and stopping short of the desired stopping position D.

The present invention increases the flow of vehicles along a given roadway by determining the maximum safe velocity at a predetermined time interval such as 18 tims a second with each such determination using the previous or old solution of maximum safe velocity as the input to the next such determination. Thusly, there is a determination of what the maximum safe velocity of vehicle travel is at any distance point along the roadway track, and then the present control operation establishes the vehicle actual speed operation to stay below the determined maximum safe velocity, as shown by profile 314 in FIG. 6. In this way, a safe performance of the vehicle brake operation is established. In addition, there is a measurement of brake quality to establish if the brake operation of the vehicle is actually performing as it was designed and expected to perform, such that as the vehicle actual speed starts approaching the determined maximum safe velocity in accordance with the profile 314, the maximum safe velocity devices 108 and 114 determine a new maximum safe velocity for each determination time interval knowing changes in track grade and vehicle operation that affect the safe velocity determination in response to an accelerometer carried by the vehicle, and a resulting control of the vehicle brake operation is provided in relation to this determined maximum safe velocity.

When the position of the vehicle is at location E along the roadway track as shown in FIG. 6, the maximum safe velocity is not being determined by the maximum safe velocity devices 108 and 114, since there is no need for this determination at this distance location of the vehicle. When a downward input command speed change occurs to below the actual speed as shown at location A, then the determination of maximum safe velocity as shown by curve 314 begins, in response to the actual vehicle speed being above the new system safe allowed input command speed 302. On the other hand should the vehicle actual speed, when the downward speed change is sensed at location A, be in fact below the new safe command speed 302, then the determination of the maximum safe velocity by the apparatus 108 and 114 will still not begin because there is no safety requirement to know the maximum safe velocity in accordance with the profile 314 and 315, since the maximum safe velocity is known to be above the actual vehicle speed.

It should be noted that the determined maximum safe velocity 314 is the safe brake speed or deceleration profile for a given vehicle, whereas the input command speed 300 is determined by the physical roadway track system and is the determined maximum allowed safe system speed in relation to required vehicle operational safety considerations. The maximum safe velocity determination by apparatus 108 and 114 in FIG. 4 is responsive to the maximum allowed input command speed determined by the roadway track system for the purpose of sensing a downward speed change such as occurs at distance locations A, B and C in FIG. 6, and in addition responds to the actual vehicle speed and to the output of an accelerometer carried by the vehicle. The maximum safe velocity determination is for each of predetermined time intervals Δt which computes the VMAX1, VMAX2, VMAX3, and so forth for each of successive time intervals, and once the actual speed is less than or equal to the input command speed, then the $V_{max}$ determination is stopped as it is no longer required. As the comparator 153 shown in FIG. 4 senses that the actual speed is no longer approaching the determined maximum safe brake velocity, then the switch 147 is operated such that the speed regulator 146 receives as its speed reference input the command speed 106 which is compared to the actual vehicle velocity 127 for the purpose of determining the speed error 148 for establishing the P signal from the P signal generator 144.

The prior art control apparatus shown in FIGS. 2 and 3 utilized the input command speed 42 for establishing an overspeed condition, whereas the control apparatus of the present invention as shown in FIG. 4 uses the maximum safe velocity 112 and 118 for the purpose of overspeed control.

In the operation of the prior art apparatus as shown in FIGS. 2 and 3, the maximum safe speed was in accordance with the input command speed 300 shown in FIG. 6 and at distance A when there was a speed change, the input command speed changed to 302 as a step function. In this operation, the maximum vehicle velocity was the command speed until a down step change and was then projected along a predetermined profile 308 until the next safe command velocity 302 was reached. In this regard, the maximum safe velocity was different than command speed only during a transition to a new safe command speed 302.

In theory, it would be desirable to control the vehicle speed from the location A to the location B as shown in FIG. 6 in relation to the movement distance along the roadway track. However, the transit vehicle does not know its actual location in relation to this distance, therefore, in accordance with the present invention, the maximum safe velocity VMAX is determined in relation to time and the transit vehicle is controlled by a speed difference error established in relation to this determined maximum safe velocity as an input reference. The speed regulator 146 controls the P signal generator 144, and the maximum safe velocity VMAX 118 provides a safe vehicle speed control on a continuous basis in relation to time and the movement of the vehicle along the roadway track, after a predetermined difference SD shown in FIG. 6 is sensed by the comparator 153 between the maximum safe velocity and the vehicle actual velocity.

In the operation of the control apparatus shown in FIG. 4 when a command speed change has occurred such as going from command speed 300 to a lower command speed 302, the maximum safe velocity is determined when the actual vehicle speed is above the new command speed and the transit vehicle is permitted to safely operate at an actual speed above the lower command speed 302 until a predetermined speed difference SD occurs in relation to the determined maximum safe velocity profile 314. And if the command speed 302 should continue the same indefinitely, then when the input command speed is equal to or greater than the actual velocity, the control operation returns to the command speed 302 being the reference input to the speed regulator 146. If the performance modification 149 is providing some percentage reduction of the command speed 106, such as 70% of that command speed, when the command speed 302 becomes the new input reference, the performance modification 149 will apply 70% of this to the speed regulator 146 as the regulation setpoint for determining the P signal by the P signal generator 144. Thusly, the determination of the maximum safe velocity VMAX provides an overspeed safety umbrella over the normal speed regulating system.

A measurement is made of the quality of the braking operation of the transit vehicle by looking at various level detection points when the vehicle is trying to follow the maximum safe velocity profile 314 such as shown in FIG. 7. The maximum safe velocity profile 314 is known to be the safe vehicle speed versus distance control profile, and if the vehicle actual speed comes too close to that profile 314 for any reason, this provides an indication of braking trouble such as an undesired slip slide condition or some other braking problem, to indicate that the vehicle brakes are letting the vehicle actual speed get too close to the maximum safe velocity profile 314. If the transit vehicle can in fact supply the required brake effort to keep the vehicle speed a predetermined difference SD under the maximum safe velocity profile 314, then the vehicle speed 316 will follow the profile 314 down to the new command speed 302 while using the maximum safe velocity or speed VMAX as the control reference, and upon reaching the new command speed 302, the new input command speed 302 will become the control reference. However, in relation to FIG. 7, if at some distance location F, a slip slide or other loss of brake system activity occurs so the vehicle slows down at a slower rate, the VMAX determination will sense this and cause the VMAX profile to change with a greater slope as shown by curve portion 320 and request a faster stop with more deceleration for the vehicle. This occurs in relation to time and the VMAX determination establishes that the vehicle will not stop at the desired distance so the VMAX reference changes to request a greater brake effort to increase the stopping effort of the vehicle by providing a different slope for the maximum safe velocity profile 320. If the vehicle responds to follow this new slope VMAX curve 320, allowing the predetermined difference, then the operation continues to the stopping point on the new input command speed curve 302 at which time the actual speed becomes less than the command speed and the new command speed becomes the control reference to the speed regulator. However, if the vehicle does not respond to the new slope VMAX curve 320, then the VMAX curve slope repeatedly increases even more than before to additionally increase the brake effort to stop the vehicle at the desired location. If a bad adhesion condition is present, the two curves can cross and in addition to normal brakes, the emergency brake system also goes on in an effort to stop the vehicle at a safe stopping location. Thusly, there is provided a monitor of the brake operation by continuing to monitor and adjust to what is happening in normal brake system operation. The VMAX curve 314 is determined continuously as an iterative determination in relation to present time and present vehicle operation, and is successively modified as may be required in response to the vehicle operation responding or not responding to succeeding modifications of the VMAX curve.

The equation which describes the general physical model for a vehicle running at some speed on a level track, and for reducing the speed to some lower speed arbitrarily is:

$$V = V_i - \int a\, dt \qquad (1)$$

where $$a = F/M \qquad (2)$$

and where
 V = Speed of Vehicle
 $V_i$ = Initial Vehicle Speed
 a = Acceleration Rate
 t = Time
 F = Force applied
 M = Mass of system If only a given amount of force is available then "a" will be grade sensitive, and the equation becomes, $$V = V_i - \int (a - g)\, dt \qquad (3)$$

Where
 g = grade and gravity effects.

The present invention uses the difference between wheel deceleration A, and the inertial measured deceleration I to compute the grade effects on the vehicle which causes deviations from the required system design deceleration rate R. In addition a correction term $V_i/V_{max}$, where $V_i$ is the initial velocity and $V_{max}$ is maximum allowed velocity incorporated to accommodate excess safety distance.

These terms are combined into an equation to determine the present maximum velocity allowed at time t if the velocity allowed at the previous time t-1 is known and the vehicle speed at time t is known.

$$V_{max}@t = V_{max}@(t-1) - \frac{V_t}{V_{max}@(t-1)} \times \qquad (4)$$

-continued $$(R - I + A) \times (\Delta T)$$

Where:
 $V_{max}@t$ = max. velocity allowed @ time $t$
 $V_{max}@(t-1)$ = max. velocity allowed @ time $t - 1$
 $V_t$ = actual vehicle speed at $t$
 R = system designed required deceleration rate
 I = vehicle deceleration rate measured by accelerometer in relation to inertial space
 A = vehicle deceleration rate measured by wheels in relation to track
 $\Delta t$ = time interval between $(t)$ and $(t - 1)$ If this determination is performed for every predetermined time interval $\Delta t$ then a continuous updating is performed which takes into account running at lower than maximum speeds and the grade changes when they occur.

DESCRIPTION OF INSTRUCTION PROGRAM LISTING

In Appendix A there is included an instruction program listing that has been prepared to provide the desired brake control of a transit vehicle in accordance with the here-disclosed control system and method. The instruction program listing is written in the basic language and is a general program establishing the functional operation of the present invention. For a specific train vehicle control application, a particular application program could be readily written in the assembly language of a suitable microprocessor, such as the Intel 8080 microprocessor computer system. Many of these computer systems have already been supplied to customers, including customer instruction books and descriptive documentation. A person skilled in this art could apply the attached program in relation to specific vehicles to be controlled for a particular vehicle track system. The above basic control equation (4) corresponds with the program equation at line 160 of the program listing.

```
    LIST

1    PRINT"BRAKE ASSURANCE WITH RANDOM GRADES AT RANDOM DIST WITH DELAY R"
2    LET R=1.2
3    LET T=.01
5    LET Q=2
7    PRINT"2/8/77,9:00 AM"
20   LET Q=Q-1
21   PRINT
22   PRINT"(INITIAL        ) STOP MAX TIME CHANGE AT"
23   PRINT"(ACC  GRD  VEL) DIST DIST      GRADE       DIST"
25   LET G2=.06
30   LET G2=G2-.02
31   LET G=G2
32   LET I=Q
33   PRINT -I;TAB(6);G
34   PRINT
35   LET V2=31.78
40   LET V1=V2=V2-5
41   LET G=G2
50   LET V=27.78
60   LET R=T1=S=S1=0
65   LET I=Q
70   LET L=250*(RND(0))
80   LET G1=(.08*RND(0))-.04
90   LET L4=L+((27.78 ↑ 2)-2*L*(1.2+10*G2))/(2*(1.2+10*G1))
91   LET V9=.5*(1.014 ↑ 2)+V2
92   LET L7=(7+(2*V2)+(((1.014) ↑ 3)/6)+V2*1.014+1.2/6+V9)
93   LET L4=L4+L7
94   IF L<L4 THEN 98
95   LET L=L4
98   REM
```

-continued

```
100  GO TO 500
110  LET I=Q
120  LET A=I+(10*G)
130  GOTO 150
140  LET I=1.2
150  LET A=I+(10*G)
155  IF T1<.9 THEN 160
156  LET R=R+1.2/180
157  IF R<1.2 THEN 160
158  LET R=1.2
160  LET V=V-(R-I+A)*(V1+.5)*I/V ← BASIC EQUATION
170  LET S=S+V*T
180  LET T1=T1+T
190  LET V1=V1-A*T
200  LET S1=S1+V1*T
205  GO TO 700
210  IF V1<0 THEN 215
211  IF V<0 THEN 215
212  GO TO 100
215  LET B=INT(V2)
216  LET C=INT(S1)
217  LET D=INT(T1)
218  LET E=INT(L4)
219  LET F=INT(L)
220  LET G3=(INT(G1*10000))/10000
300  PRINT TAB(14);B;TAB(20);C;TAB(26):E:TAB(33):D:TAB(43):G3:TAB(57):F
310  GOTO 400
320  GO TO 400
400  IF V2>6 THEN 40
410  IF G2>-.03 THEN 30
420  IF Q>-.9 THEN 20
430  END
500  IF V1>(V-1) THEN 510
510  IF Q>0 THEN 570
530  LET I=I-Q/100
540  IF I>-1.2 THEN 560
550  LET I=-1.2
560  GO TO 640
570  LET I=I-1.2/100
580  IF I>0 THEN 600
590  LET I=0
600  GO TO 640
610  LET I=I+1.4/100
620  IF I<1.4 THEN 640
630  LET I=1.4
640  LET I=I+(10*((V1+1)-V))
641  IF I>-1.4 THEN 644
642  LET I=-1.4
643  GO TO 650
644  IF I<1.4 THEN 650
645  LET I=1.4
646  GO TO 650
650  GO TO 150
700  IF S1<1 THEN 210
701  LET M=ABS((G1-G2)/100)
702  IF ABS(G1-G)<2*M THEN 210
703  IF G>G1 THEN 705
704  LET G=G+M
705  IF G<G1 THEN 210
706  LET G=G-M
707  GO TO 210
710  GOTO 210
*
```

BRAKE ASSURANCE WITH RANDOM GRADES AT RANDOM DIST WITH DELAY R
2/8/77,9:00 AM

| (INITIAL (ACC | ) GRD | VEL) | STOP DIST | MAX DIST | TIME | CHANGE AT GRADE | DIST |
|---|---|---|---|---|---|---|---|
| −1 | 4.E-02 | | | | | | |
| | | 26 | 335 | 422 | 24 | 2.E-04 | 42 |
| | | 21 | 263 | 337 | 19 | 3.88E-02 | 119 |
| | | 16 | 263 | 323 | 21 | 1.66E-02 | 202 |
| | | 11 | 271 | 320 | 23 | 2.37E-02 | 30 |
| | | 6 | 275 | 316 | 27 | −4.7E-03 | 137 |
| | | 1 | 244 | 271 | 28 | 2.05E-02 | 133 |
| −1 | 2.E-02 | | | | | | |
| | | 26 | 356 | 426 | 29 | −3.99E-02 | 228 |
| | | 21 | 305 | 375 | 22 | 1.66E-02 | 71 |

-continued

BRAKE ASSURANCE WITH RANDOM GRADES AT RANDOM DIST WITH DELAY R
2/8/77,9:00 AM

| (INITIAL | ) | STOP | MAX | TIME | CHANGE AT | |
|---|---|---|---|---|---|---|
| (ACC | GRD | VEL) | DIST | DIST | | GRADE | DIST |
| | | 16 | 351 | 409 | 27 | −7.7E-03 | 38 |
| | | 11 | 338 | 386 | 28 | −9.E-03 | 60 |
| | | 6 | 370 | 415 | 35 | −3.69E-02 | 122 |
| | | 1 | 322 | 358 | 35 | −3.22E-02 | 161 |
| −1 | 0 | | | | | | |
| | | 26 | 491 | 565 | 36 | −3.67E-02 | 28 |
| | | 21 | 342 | 409 | 25 | 5.1E-03 | 141 |
| | | 16 | 367 | 420 | 29 | −1.94E-02 | 196 |
| | | 11 | 387 | 433 | 32 | −2.31E-02 | 84 |
| | | 6 | 335 | 370 | 30 | −8.5E-03 | 139 |
| | | 1 | 276 | 297 | 27 | 2.81E-02 | 115 |
| −1 | −2.E-02 | | | | | | |
| | | 26 | 376 | 457 | 25 | 1.81E-02 | 227 |
| | | 21 | 355 | 418 | 25 | 1.E-04 | 13 |
| | | 16 | 364 | 416 | 27 | −2.E-03 | 95 |
| | | 11 | 346 | 389 | 25 | 2.7E-02 | 224 |
| | | 6 | 318 | 348 | 26 | 1.57E-02 | 112 |
| | | 1 | 342 | 363 | 31 | −7.E-04 | 155 |
| −1 | −4.E-02 | | | | | | |
| | | 26 | 426 | 496 | 30 | −1.53E-02 | 54 |
| | | 21 | 462 | 517 | 33 | −2.33E-02 | 136 |
| | | 16 | 349 | 399 | 25 | 8.6E-03 | 64 |
| | | 11 | 351 | 390 | 27 | 5.2E-0.3 | 75 |
| | | 6 | 393 | 421 | 31 | −9.E-03 | 141 |
| | | 1 | 288 | 305 | 27 | 2.09E-02 | 39 |
| 0 | 4.E-02 | | | | | | |
| | | 26 | 309 | 395 | 23 | 1.4E-03 | 119 |
| | | 21 | 273 | 345 | 21 | 1.6E-02 | 189 |
| | | 16 | 309 | 370 | 24 | 6.9E-03 | 33 |
| | | 11 | 285 | 335 | 26 | −1.16E-02 | 158 |
| | | 6 | 241 | 277 | 23 | 3.83E-02 | 170 |
| | | 1 | 264 | 301 | 32 | −2.87E-02 | 181 |
| 0 | 2.E-02 | | | | | | |
| | | 26 | 339 | 422 | 25 | −5.E-04 | 91 |
| | | 21 | 297 | 368 | 21 | 2.39E-02 | 195 |
| | | 16 | 355 | 413 | 28 | −1.22E-02 | 64 |
| | | 11 | 419 | 470 | 36 | −3.98E-02 | 87 |
| | | 6 | 379 | 419 | 34 | −2.4E-02 | 36 |
| | | 1 | 269 | 294 | 28 | 1.46E-02 | 188 |
| 0 | 0 | | | | | | |
| | | 26 | 354 | 435 | 25 | 2.7E-03 | 240 |
| | | 21 | 302 | 371 | 21 | 2.53E-02 | 59 |
| | | 16 | 340 | 395 | 26 | 1.E-03 | 172 |
| | | 11 | 418 | 464 | 34 | −2.93E-02 | 48 |
| | | 6 | 361 | 399 | 33 | −2.54E-02 | 162 |
| | | 1 | 435 | 470 | 41 | −3.88E-02 | 42 |
| 0 | −2.E-02 | | | | | | |
| | | 26 | 372 | 451 | 25 | 8.3E-03 | 158 |
| | | 21 | 349 | 413 | 25 | 1.9E-03 | 8 |
| | | 16 | 397 | 448 | 30 | −1.6E-02 | 55 |
| | | 11 | 380 | 422 | 30 | −1.21E-02 | 128 |
| | | 6 | 424 | 459 | 36 | −3.11E-02 | 78 |
| | | 1 | 424 | 451 | 38 | −3.17E-02 | 2 |
| 0 | −4.E-02 | | | | | | |
| | | 26 | 453 | 523 | 31 | −1.46E-02 | 176 |
| | | 21 | 443 | 499 | 31 | −2.04E-02 | 84 |
| | | 16 | 334 | 385 | 24 | 1.28E-02 | 50 |
| | | 11 | 399 | 439 | 29 | 6.5E-03 | 215 |
| | | 6 | 366 | 394 | 29 | 6.5E-03 | 149 |
| | | 1 | 431 | 455 | 38 | −3.17E-02 | 43 |
| 1 | 4.E-02 | | | | | | |
| | | 26 | 277 | 365 | 20 | 2.68E-02 | 144 |
| | | 21 | 305 | 378 | 23 | 1.1E-02 | 52 |
| | | 16 | 342 | 403 | 28 | −1.65E-02 | 80 |
| | | 11 | 280 | 330 | 24 | 2.3E-03 | 130 |
| | | 6 | 277 | 316 | 27 | 6.6E-03 | 88 |
| | | 1 | 321 | 353 | 33 | −1.03E-02 | 28 |
| 1 | 2.E-02 | | | | | | |
| | | 26 | 301 | 387 | 21 | 3.09E-02 | 233 |
| | | 21 | 308 | 376 | 23 | −4.E-04 | 245 |
| | | 16 | 460 | 519 | 35 | −3.59E-02 | 20 |
| | | 11 | 290 | 336 | 24 | 1.57E-02 | 83 |
| | | 6 | 274 | 309 | 25 | 2.63E-02 | 239 |
| | | 1 | 311 | 338 | 31 | −3.E-03 | 29 |
| 1 | 0 | | | | | | |
| | | 26 | 298 | 382 | 21 | 3.E-02 | 48 |
| | | 21 | 325 | 392 | 23 | 1.27E-02 | 72 |

-continued

BRAKE ASSURANCE WITH RANDOM GRADES AT RANDOM DIST WITH DELAY R
2/8/77,9:00 AM

| (INITIAL ACC | GRD) | VEL | STOP DIST | MAX DIST | TIME | CHANGE AT GRADE | DIST |
|---|---|---|---|---|---|---|---|
| | | 16 | 299 | 355 | 22 | 3.E-02 | 116 |
| | | 11 | 350 | 395 | 28 | −6.7E-03 | 2 |
| | | 6 | 277 | 309 | 24 | 3.08E-02 | 90 |
| | | 1 | 295 | 317 | 29 | 1.67E-02 | 167 |
| 1 | −2.E-02 | | | | | | |
| | | 26 | 331 | 411 | 23 | 2.04E-02 | 75 |
| | | 21 | 325 | 391 | 22 | 2.8E-02 | 110 |
| | | 16 | 405 | 456 | 30 | −1.87E-02 | 28 |
| | | 11 | 331 | 373 | 24 | 3.16E-02 | 188 |
| | | 6 | 379 | 412 | 32 | −1.67E-02 | 129 |
| | | 1 | 336 | 356 | 30 | 1.48E-02 | 213 |
| 1 | −4.E-02 | | | | | | |
| | | 26 | 487 | 553 | 34 | −2.8E-02 | 146 |
| | | 21 | 523 | 574 | 38 | −3.94E-02 | 107 |
| | | 16 | 386 | 440 | 25 | 3.7E-02 | 243 |
| | | 11 | 469 | 508 | 36 | −2.96E-02 | 227 |
| | | 6 | 347 | 375 | 28 | 1.17E-02 | 119 |
| | | 1 | 376 | 393 | 31 | 1.24E-02 | 219 |

I claim:

1. In brake control apparatus for a vehicle operative with a roadway having a predetermined design deceleration rate and having a command speed to establish the actual speed of the vehicle in relation to that roadway, the combination of:
means including an accelerometer coupled with the vehicle for sensing a first deceleration of the vehicle in relation to inertial space,
means including a tachometer coupled with the vehicle for sensing the actual speed of the vehicle and determining a second deceleration of the vehicle in relation to the roadway,
means responsive to the actual speed being greater than the command speed for determining a safe brake velocity for the vehicle in accordance with a predetermined speed control relationship including each of said design deceleration rate, said first deceleration and said second deceleration, and
speed control means responsive to the command speed for controlling the actual speed of the vehicle until there is a predetermined speed difference between the safe brake velocity and the actual speed when the speed control means becomes responsive to the determined safe brake velocity.

2. The brake control apparatus of claim 1, including:
means for controlling an overspeed condition of the vehicle in relation to the safe brake velocity and in response to said safe brake velocity.

3. The brake control apparatus of claim 1,
with the speed control relationship of the safe brake velocity determining means including a previously determined safe brake velocity.

4. The brake control apparatus of claim 1, including the safe brake velocity determining means being responsive to the command speed being greater than the actual speed to discontinue the determination of the safe brake velocity.

5. The brake control apparatus of claim 1, including:
said speed control means determining when the actual speed is within said predetermined speed difference below the determined safe brake velocity for providing the control of the actual speed in response to the safe brake velocity.

6. The brake control apparatus of claim 1, including:
said speed control means determining when the actual speed is below the command speed for providing the control of the actual speed in response to the command speed.

7. The brake control apparatus of claim 1, including:
said speed control means determining said speed difference between the vehicle actual speed and the safe brake velocity, and
means for providing at least two predetermined brake efforts in response to the magnitude of the speed difference.

8. The method of brake control for a vehicle operative with a roadway having a predetermined design deceleration rate and having a command speed, including the steps of:
determining the actual speed and a first deceleration of the vehicle in relation to the roadway as measured by a tachometer coupled to the vehicle,
determining a second deceleration of the vehicle in relation to inertial space as measured by an accelerometer coupled to the vehicle,
determining a safe brake velocity in accordance with a predetermined relationship including said design deceleration rate and the difference between the first deceleration and the second deceleration when the actual speed is greater than the command speed, and
controlling the vehicle actual speed to stay below the safe brake velocity in response to a predetermined speed difference between the actual speed and the determined safe brake velocity.

9. The method of brake control of claim 8, with the control of vehicle actual speed being provided in response to the safe brake velocity when the actual speed is within said predetermined difference in relation to the safe brake velocity.

10. The method of brake control of claim 8,
with the control of vehicle actual speed being provided by a speed regulation in response to the actual speed until the actual speed is within said predetermined speed difference and then in response to the determined safe brake velocity for maintaining at least said predetermined speed difference between the actual speed and the determined brake velocity.

11. The brake control method of claim 8, with the safe brake velocity not being determined when the actual speed is less than the command speed.

12. The brake control method of claim 8, including the step of:
controlling an overspeed condition of the vehicle in response to the safe brake velocity when the actual speed is less than said predetermined speed difference from the safe brake velocity.

13. The brake control method of claim 8, including:
determining said speed difference between the actual speed and the safe brake velocity, and
preventing an overspeed of the vehicle in relation to said safe brake velocity in response to said safe brake velocity.

14. The brake control method of claim 8, including the steps of:
determining said speed difference in relation to the actual speed and the safe brake velocity, and
providing at least two predetermined brake efforts for the vehicle in response to respective magnitudes of said speed difference.

15. In control apparatus for a vehicle having wheels and operative with a track having a command speed to establish the desired speed of the vehicle in relation to that track, the combination of:
means for sensing a first inertial deceleration rate of the vehicle in relation to the inertia of the vehicle and a first wheel deceleration rate in relation to said track;
means for sensing a second inertial deceleration rate of the vehicle in relation to the inertia of the vehicle and a second wheel deceleration rate in relation to the vehicle track;
means for determining a first safe brake velocity for the vehicle in response to the command speed and in accordance with a predetermined speed control relationship including the first inertial deceleration rate and the first wheel deceleration rate;
means for determining a second safe brake velocity for the vehicle in response to the command speed and in accordance with said speed control relationship including the second inertial deceleration rate and the second wheel deceleration rate;
means for determining a first speed error in response to the first safe brake velocity;
means for determining a second speed error in response to the second safe brake velocity; and
means for comparing the first speed error with the second speed error for controlling the actual speed of said vehicle.

16. The control apparatus of claim 15, including:
means for sensing the actual speed of the vehicle; and
means for sensing when the actual speed is within a predetermined difference in relation to one of the first and second safe brake velocities for controlling the actual speed of said vehicle in response to said one safe brake velocity.

* * * * *